US009069436B1

(12) United States Patent
Fieweger et al.

(10) Patent No.: US 9,069,436 B1
(45) Date of Patent: Jun. 30, 2015

(54) SYSTEM AND METHOD FOR INFORMATION DELIVERY BASED ON AT LEAST ONE SELF-DECLARED USER ATTRIBUTE

(75) Inventors: Andrew Fieweger, Fairfield, CT (US); Matthew Wadley, New York, NY (US); Angela Azzolino, Brooklyn, NY (US); Michael Sassin, Andover, MA (US)

(73) Assignee: INTRALINKS, INC., New York, NY (US)

( * ) Notice: Subject to any disclaimer, the term of this patent is extended or adjusted under 35 U.S.C. 154(b) by 564 days.

(21) Appl. No.: 11/395,701

(22) Filed: Mar. 31, 2006

Related U.S. Application Data

(60) Provisional application No. 60/667,888, filed on Apr. 1, 2005.

(51) Int. Cl.
G06F 3/0481 (2013.01)
H04M 11/00 (2006.01)

(52) U.S. Cl.
CPC ............ G06F 3/0481 (2013.01); *H04M 11/00* (2013.01)

(58) Field of Classification Search
CPC ......... G06F 7/00; G06F 17/30; G06F 17/227; G06F 2221/2143; G06F 3/0481; H04M 11/00
USPC ...................... 709/229, 217; 707/102; 705/26
See application file for complete search history.

(56) References Cited

U.S. PATENT DOCUMENTS

| 5,537,618 A | * | 7/1996 | Boulton et al. ............... 715/745 |
| 5,630,159 A | * | 5/1997 | Zancho ......................... 709/221 |
| 5,694,596 A | | 12/1997 | Campbell |
| 5,721,827 A | | 2/1998 | Logan et al. |
| 5,771,355 A | | 6/1998 | Kuzma |
| 5,781,901 A | | 7/1998 | Kuzma |
| 5,790,790 A | | 8/1998 | Smith et al. |
| 5,815,665 A | | 9/1998 | Teper et al. |
| 5,898,780 A | | 4/1999 | Liu et al. |
| 5,903,723 A | | 5/1999 | Beck et al. |
| 5,923,756 A | | 7/1999 | Shambroom |
| 5,937,405 A | | 8/1999 | Campbell |

(Continued)

FOREIGN PATENT DOCUMENTS

| JP | 2002318802 A | 10/2002 |
| WO | 2011160855 A1 | 12/2011 |

(Continued)

OTHER PUBLICATIONS

"Cimage Content Lifecycle Management", available at: http://web.archive.org/web/20010205074400/www.cimage.com/products/e31index.html, retrieved on Sep. 23, 2001, 1 page.

(Continued)

*Primary Examiner* — O. C. Vostal
(74) *Attorney, Agent, or Firm* — GTC Law Group LLP & Affiliates

(57) ABSTRACT

Various embodiments of the present invention are directed to providing a user the ability to self-declare one or more permission attributes about the user that form the basis for the filtering (e.g., the dynamic filtering) of current and/or future content. In this manner, access to the content may thus be governed by the self-declared permission attributes (in one example (which example is intended to be illustrative and not restrictive), the present invention may operate within a secure, tracked content delivery infrastructure).

13 Claims, 15 Drawing Sheets

(56) References Cited

U.S. PATENT DOCUMENTS

| | | | |
|---|---|---|---|
| 5,961,590 A | 10/1999 | Mendez et al. | |
| 6,029,146 A | 2/2000 | Hawkins et al. | |
| 6,088,722 A * | 7/2000 | Herz et al. | 709/217 |
| 6,092,114 A | 7/2000 | Shaffer et al. | |
| 6,112,181 A * | 8/2000 | Shear et al. | 705/1 |
| 6,148,342 A | 11/2000 | Ho | |
| 6,192,407 B1 | 2/2001 | Smith et al. | |
| 6,223,177 B1 | 4/2001 | Tatham et al. | |
| 6,233,608 B1 | 5/2001 | Laursen et al. | |
| 6,253,326 B1 | 6/2001 | Lincke et al. | |
| 6,266,692 B1 | 7/2001 | Greenstein | |
| 6,370,575 B1 | 4/2002 | Dougherty et al. | |
| 6,385,644 B1 | 5/2002 | Devine et al. | |
| 6,385,655 B1 | 5/2002 | Smith et al. | |
| 6,397,261 B1 | 5/2002 | Eldridge et al. | |
| 6,421,678 B2 | 7/2002 | Smiga et al. | |
| 6,430,601 B1 | 8/2002 | Eldridge et al. | |
| 6,442,571 B1 | 8/2002 | Haff et al. | |
| 6,453,348 B1 | 9/2002 | Barnier et al. | |
| 6,493,760 B1 | 12/2002 | Pendlebury et al. | |
| 6,515,988 B1 | 2/2003 | Eldridge et al. | |
| 6,529,956 B1 | 3/2003 | Smith et al. | |
| 6,591,291 B1 | 7/2003 | Gabber et al. | |
| 6,678,698 B2 | 1/2004 | Fredell et al. | |
| 6,718,367 B1 | 4/2004 | Ayyadurai | |
| 6,738,981 B1 * | 5/2004 | Tonnby et al. | 725/98 |
| 6,816,906 B1 * | 11/2004 | Icken et al. | 709/229 |
| 6,898,636 B1 | 5/2005 | Adams et al. | |
| 6,904,449 B1 * | 6/2005 | Quinones | 709/203 |
| 6,941,285 B2 * | 9/2005 | Sarcanin | 705/67 |
| 7,140,035 B1 * | 11/2006 | Karch | 726/1 |
| 7,143,175 B2 | 11/2006 | Adams et al. | |
| 7,146,367 B2 * | 12/2006 | Shutt | 709/217 |
| 7,168,094 B1 | 1/2007 | Fredell | |
| 7,225,157 B2 | 5/2007 | Howard et al. | |
| 7,233,992 B1 | 6/2007 | Muldoon et al. | |
| 7,302,634 B2 * | 11/2007 | Lucovsky et al. | 715/200 |
| 7,580,988 B2 * | 8/2009 | Rudd | 709/217 |
| 7,587,504 B2 | 9/2009 | Adams et al. | |
| 7,814,537 B2 | 10/2010 | Fredell | |
| 7,966,388 B1 * | 6/2011 | Pugaczewski et al. | 709/223 |
| 8,751,793 B2 * | 6/2014 | Ginter et al. | 713/156 |
| 2001/0027477 A1 | 10/2001 | Nakamura et al. | |
| 2001/0028364 A1 | 10/2001 | Fredell et al. | |
| 2002/0095499 A1 * | 7/2002 | Barnett et al. | 709/226 |
| 2002/0099837 A1 * | 7/2002 | Oe et al. | 709/229 |
| 2002/0112240 A1 * | 8/2002 | Bacso et al. | 725/47 |
| 2002/0123924 A1 | 9/2002 | Cruz | |
| 2002/0138744 A1 * | 9/2002 | Schleicher et al. | 713/187 |
| 2002/0156695 A1 * | 10/2002 | Edwards | 705/26 |
| 2002/0162005 A1 * | 10/2002 | Ueda et al. | 713/182 |
| 2002/0162027 A1 | 10/2002 | Itwaru | |
| 2002/0184191 A1 | 12/2002 | Marpe et al. | |
| 2003/0046313 A1 * | 3/2003 | Leung et al. | 707/204 |
| 2003/0074580 A1 * | 4/2003 | Knouse et al. | 713/201 |
| 2003/0097410 A1 | 5/2003 | Atkins et al. | |
| 2003/0105734 A1 | 6/2003 | Hitchen et al. | |
| 2003/0105764 A1 * | 6/2003 | Kageyama et al. | 707/10 |
| 2003/0105978 A1 * | 6/2003 | Byrne | 713/201 |
| 2003/0172296 A1 | 9/2003 | Gunter | |
| 2003/0225763 A1 * | 12/2003 | Guilak et al. | 707/7 |
| 2003/0225796 A1 * | 12/2003 | Matsubara | 707/200 |
| 2003/0226105 A1 | 12/2003 | Waldau | |
| 2003/0229900 A1 * | 12/2003 | Reisman | 725/87 |
| 2004/0006594 A1 * | 1/2004 | Boyer et al. | 709/204 |
| 2004/0034646 A1 * | 2/2004 | Kimball et al. | 707/102 |
| 2004/0054790 A1 * | 3/2004 | Himmel et al. | 709/229 |
| 2004/0103202 A1 * | 5/2004 | Hildebrand et al. | 709/229 |
| 2004/0221118 A1 * | 11/2004 | Slater et al. | 711/163 |
| 2004/0267762 A1 * | 12/2004 | Tunning et al. | 707/100 |
| 2005/0060643 A1 * | 3/2005 | Glass et al. | 715/501.1 |
| 2005/0091077 A1 * | 4/2005 | Reynolds | 705/1 |
| 2005/0102534 A1 * | 5/2005 | Wong | 713/201 |
| 2005/0114661 A1 * | 5/2005 | Cheng et al. | 713/167 |
| 2005/0138110 A1 * | 6/2005 | Redlich et al. | 709/201 |
| 2005/0193043 A1 * | 9/2005 | Hoover | 707/204 |
| 2005/0231738 A1 * | 10/2005 | Huff et al. | 358/1.1 |
| 2005/0240572 A1 * | 10/2005 | Sung et al. | 707/3 |
| 2006/0031412 A1 | 2/2006 | Adams et al. | |
| 2006/0047752 A1 * | 3/2006 | Hornby | 709/205 |
| 2006/0048099 A1 * | 3/2006 | Templin et al. | 717/124 |
| 2006/0075028 A1 | 4/2006 | Zager et al. | |
| 2006/0136417 A1 * | 6/2006 | Avinash et al. | 707/9 |
| 2007/0079137 A1 | 4/2007 | Tu | |
| 2007/0088846 A1 | 4/2007 | Adams et al. | |
| 2007/0118889 A1 | 5/2007 | Fredell | |
| 2007/0185875 A1 * | 8/2007 | Chang et al. | 707/9 |
| 2007/0266104 A1 | 11/2007 | Bolf et al. | |
| 2008/0201299 A1 * | 8/2008 | Lehikoinen et al. | 707/3 |
| 2009/0172795 A1 | 7/2009 | Ritari et al. | |
| 2009/0204580 A1 | 8/2009 | Seamon et al. | |
| 2010/0005520 A1 | 1/2010 | Abbot et al. | |
| 2010/0138797 A1 | 6/2010 | Thorn | |
| 2011/0029666 A1 | 2/2011 | Lopatecki et al. | |
| 2011/0289574 A1 | 11/2011 | Hull et al. | |
| 2013/0054514 A1 | 2/2013 | Barrett-Kahn | |
| 2013/0318589 A1 | 11/2013 | Ford et al. | |
| 2014/0047560 A1 | 2/2014 | Meyer et al. | |
| 2014/0143831 A1 | 5/2014 | Fieweger | |
| 2014/0189483 A1 | 7/2014 | Awan et al. | |
| 2014/0189818 A1 | 7/2014 | Meyer | |
| 2014/0245015 A1 | 8/2014 | Velamoor et al. | |
| 2014/0304836 A1 | 10/2014 | Velamoor et al. | |

FOREIGN PATENT DOCUMENTS

| | | |
|---|---|---|
| WO | 2013163625 A1 | 10/2013 |
| WO | 2014025809 A1 | 2/2014 |
| WO | 2014063030 A1 | 4/2014 |
| WO | 2014063030 A9 | 9/2014 |
| WO | 2014152025 A2 | 9/2014 |
| WO | 2014152025 A3 | 11/2014 |

OTHER PUBLICATIONS

"Doculogic Press Release", available at: www.archivesystems.com/pressroom/press_doculogic.asp, retrieved on Apr. 11, 2000, 2 pages.

"DocuTouch Features", available at : http://web.archive.org/web/20011218003617/www.docutouch.com/dt_productfeatures.html, retrived on Dec. 17, 2001, 2 pages.

"FilesOnTheNet.com Product Specifications", available at: http://webarchive.org/web/20000914181459/www.filesonthenet.com/FOTNProdSoecs.PDF, retrieved on Sep. 14, 2000, 4 pages.

"Net Documents Overview", available at: http://web.archive.org/web/20010822083155/www. netdocuments.com/main.asp?l1=5&12=1&13=510, retrieved on Jul. 6, 2001, 1 page.

Backer, Andreas et al., "DocMan: A Document Management System for Cooperation Support", Proceedings of the Twenty-Ninth Hawaii International Conference on System Science, vol. 3, Jan. 3-6, 1996, pp. 82-91.

Barker, Brian , "M&A Today, a Newsletter for the Professional Intermediary vol. 8, No. 9", Sep. 1999, 4 pages.

Braun, T. et al., "Virtual Private Network Architecture", Apr. 1999, pp. 1-31.

Chan, M. C. et al., "Customer Management and Control of Broadband VPN Services", Integrated Network Management, 1997, 14 pages.

Netscape Extranet Standards, "Overview of Extranet Standards: Extending the Networked Enterprise", http://web.archive.org/web/19990218194752/http://sitesearch.netscape.com/products/whitepaper/extranetstds.html, 1999, 5 pages.

PCT/US2013/038533, , "International Application Serial No. PCT/US2013/038533, International Search Report and Written Opinion mailed Aug. 23, 2013", Interest Intralinks, Inc., 23 pages.

Screen Shot of Page of IntraLinks Web Site; www.intralinks.com, 2004

(56) References Cited

OTHER PUBLICATIONS

PCT/US2014/026830, "International Application Serial No. PCT/US2014/026830, International Search Report and Written Opinion mailed Sep. 17, 2014", Intralinks, Inc., 18 Pages.

PCT/US2013/053835, International Application Serial No. PCT/US2013/053835, International Search Report and Written Opinion mailed Nov. 27, 2013, Intralinks, Inc., 13 Pages.

PCT/US2013/065646, International Application Serial No. PCT/US2013/065646, International Search Report and Written Opinion mailed Feb. 10, 2014, Intralinks, Inc., 14 Pages.

* cited by examiner

INTRALINKS
<QAPUBLICATIONS_COMMENTS@INTRALINKS.COM>

01/17/2005 03:38 PM

TO 01/17/2005 03:38 PM
CC
BCC
SUBJECT 4.9 SALES TRAINING: PVP - PRIVATE PUBLICATION "CLIENT CONFERENCE CALL NOTES"

PLEASE RESPOND TO INTRALINKS
<ILADMIN@INTRALINKS.COM>

☐ ALERTS WILL ALSO CLEARLY INDICATE CLASSIFICATION OF INFORMATION
☐ ALERTS WILL GO OUT ON ALL INFORMATION REGARDLESS OF DECLARATION

1. NOTE FROM ADMIN / INTRALINKS_NY
-----
2. DETAILS
INVESTOR:   PRIVATE INFORMATION
TYPE:       PUBLICATION
TITLE:      CLIENT CONFERENCE CALL NOTES
FOLDER:     CORRESPONDENCE
WORKSPACE:  4.9 SALES TRAINING: PVP

LINK:
HTTPS://PREVIEW.INTRALINKS.COM/AZ?P=1&W=30711&I=401141
-----
3. PRIMARY CONTACTS

NONE
-----
FORGOT YOUR PASSWORD? HTTPS://PREVIEW.INTRALINKS.COM/HTML/VISITOR/IDENTIFYVISITOR.JSP
NEW YORK: 212-543-7800
TOLL-FREE IN THE US: 888-546-5383

*FIG. 3*

SYSTEM AND METHOD FOR INFORMATION DELIVERY BASED ON AT LEAST ONE SELF-DECLARED USER ATTRIBUTE

RELATED APPLICATIONS

This application claims the benefit of U.S. Provisional Application Ser. No. 60/667,888, filed Apr. 1, 2005, which is incorporated herein by reference in its entirety.

FIELD OF THE INVENTION

Various embodiments of the present invention are directed to providing a user the ability to self-declare one or more permission attributes about the user that form the basis for the filtering (e.g., the dynamic filtering) of current and/or future content. In this manner, access to the content may thus be governed by the self-declared permission attributes (in one example (which example is intended to be illustrative and not restrictive), the present invention may operate within a secure, tracked content delivery infrastructure).

For the purposes of describing and claiming the present invention the term "self-declared" is intended to refer to an indication or selection associated with a given entity that is made by the given entity itself.

Further, for the purposes of describing and claiming the present invention the term "value" (e.g., as used in "classification value" or "permission attribute value") is intended to refer to a numeric indicator (e.g., a distinct number, a range of numbers) or an alphanumeric indicator (e.g., a text label such as "private", "public", "yes", "no").

BACKGROUND OF THE INVENTION

Security systems typically provide a way of filtering information based on criteria that are defined by an administrator. While such a typical security system may prevent a user from gaining access to protected system content if the user is not explicitly permissioned to do so, various embodiments of the present invention provide the ability to reveal certain content only to users with certain attributes, even if, for example, the system administrator is unaware of the user's identity or affiliation and the user is unaware of the nature of the content.

The filtering of the present invention may thus dynamically allow the same content to be accessed or not accessed by a particular user, based on self-declared permission attribute(s), in each situation. For example, the ability to self-declare the permission attribute(s) may help reduce the administrative overhead associated with granting or withdrawing permissions (e.g., depending on the business process) and enhance compliance with laws and policies regulating the users.

Of note, a security system working properly typically prevents access to information such that a user should only gain access to information that he or she should not have only in the event of mistakes by the system administrator. Unauthorized access otherwise should not occur while the system is operational.

In this regard, introducing the ability of a user to self-declare permission attribute(s) may increase the risk of abuse or violation of policies. Various embodiments of the present invention therefore provide the ability to track access to information. This audit information can be reviewed, for example, in the form of a report or sophisticated search criteria and can return a list of possible violations of regulations (e.g., a compliance officer can use the findings to investigate possible violations).

SUMMARY OF THE INVENTION

One embodiment of the present invention relates to a computer implemented method of controlling access to at least one document, comprising: receiving for storage from a first user at least one document; receiving from the first user at least one classification associated with the stored document, wherein the classification has a value selected from at least a first classification value and a second classification value; receiving from a second user at least one permission attribute associated with the second user, wherein the permission attribute associated with the second user is self-declared and wherein the permission attribute has a value selected from at least a first permission attribute value and a second permission attribute value; and permitting the second user to access the stored document if the classification value of the stored document matches the permission attribute value declared by the second user.

One example business reason for utilizing the present invention may stem from concerns within the syndicated loan market. In such a syndicated loan market, loans are marketed to investors (including, without limitation, banks, debt funds, hedge funds). Many of the investors are institutional investors that invest in both the public markets (e.g., bonds, equity) and in the private loan market. Since disclosure related to certain loans often includes material non-public information (i.e., "private" information such as financial projections), these institutional investors have the potential to be conflicted with regard to insider trading regulations (e.g., regulations promulgated by the SEC). As such, users within these firms may require the ability to indicate their status on a particular loan based on: a) whether they are or may trade in the stocks/bonds of that borrowing entity (e.g., on the "public" side); and/or b) have procedure to prevent trading securities of the borrower or have walls/controls that allow them to trade in securities of the borrower while also investing in the loan market (e.g., on the "private" side). Based on their position for any given borrower, they should only see appropriate disclosure materials. Even accidental exposure to "private" information for a "public" investor can be problematic (syndicating agents are typically not aware of each investor's position for any given borrower and therefore typically have no clear way to permission content to them).

Similarly, in another example (which example is intended to be illustrative and not restrictive), classifications may be assigned so as to not cause parties involved in pre-merger due diligence or formation of joint ventures to violate antitrust regulations. Users such as professional advisors, executive management or directors could be granted broader access to counterparty information than users from within operating units (e.g., sales, regional managers, etc.), so that pricing and other information can be filtered, without knowing in advance the name, affiliation or security level of all users that could be invited to access content on the system for purposes of the transaction.

Similarly, in yet another example (which example is intended to be illustrative and not restrictive), classifications may be assigned so as to preserve attorney-client privilege with respect to content. Only users that identify themselves in a manner consistent with the preservation of privilege (e.g. attorneys rendering advice or responding to requests for legal advice and persons within client organizations authorized to request and receive legal advice) would be granted access to the content associated with such classifications.

BRIEF DESCRIPTION OF THE DRAWINGS

FIG. 3 shows a screenshot of an alert relating to certain stored information according to an embodiment of the present invention;

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Referring now to FIGS. 1A-1F, the classification of and controlled access to certain information according to an embodiment of the present invention is shown.

Figure 1A:
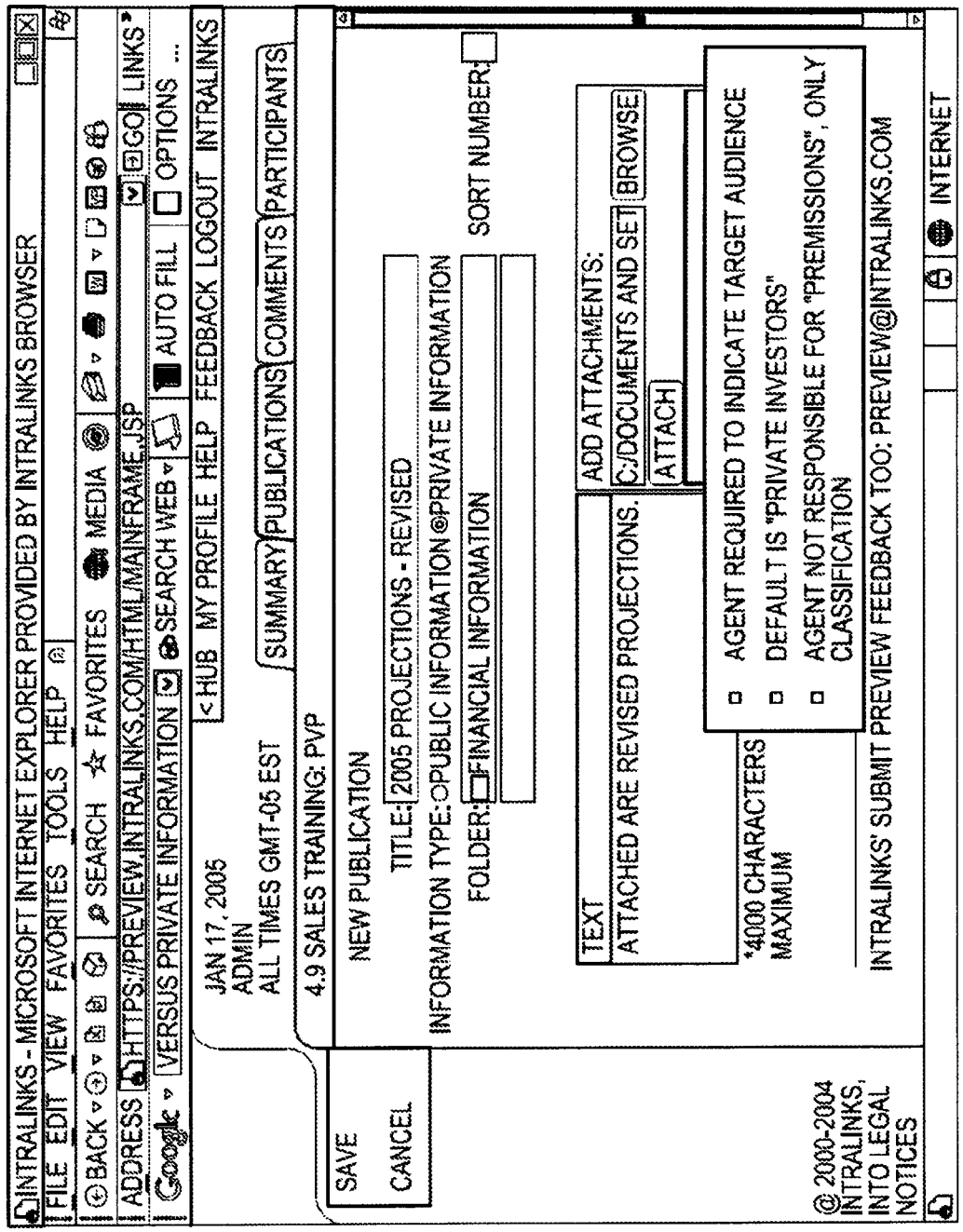
FIG. 1A shows a web browser screenshot of the uploading and classification of a document according to an embodiment of the present invention.

More particularly, FIG. 1A shows a web browser screenshot of the uploading and classification of a document according to an embodiment of the present invention. As seen in this Fig., a user (e.g., an administrative agent or a syndicating agent) indicates a target audience. In this example relating to potential investors, the choices for the classification values are "Public" and "Private". Further, in this example the default classification value is "Private" (of course, the default classification value could be something other, such as "Public"). Of note, the user uploading the information is not responsible for permissions related to people who may try to access the information, only to the classification of the information.

Of course, after content is uploaded to the enterprise information system, the uploader, an administrator or a content manager may change the visibility setting for the content (defined by the classification value). Thus, in this example, the visibility setting may be changed from "Public" to "Private" or visa versa.

Figure 1B:
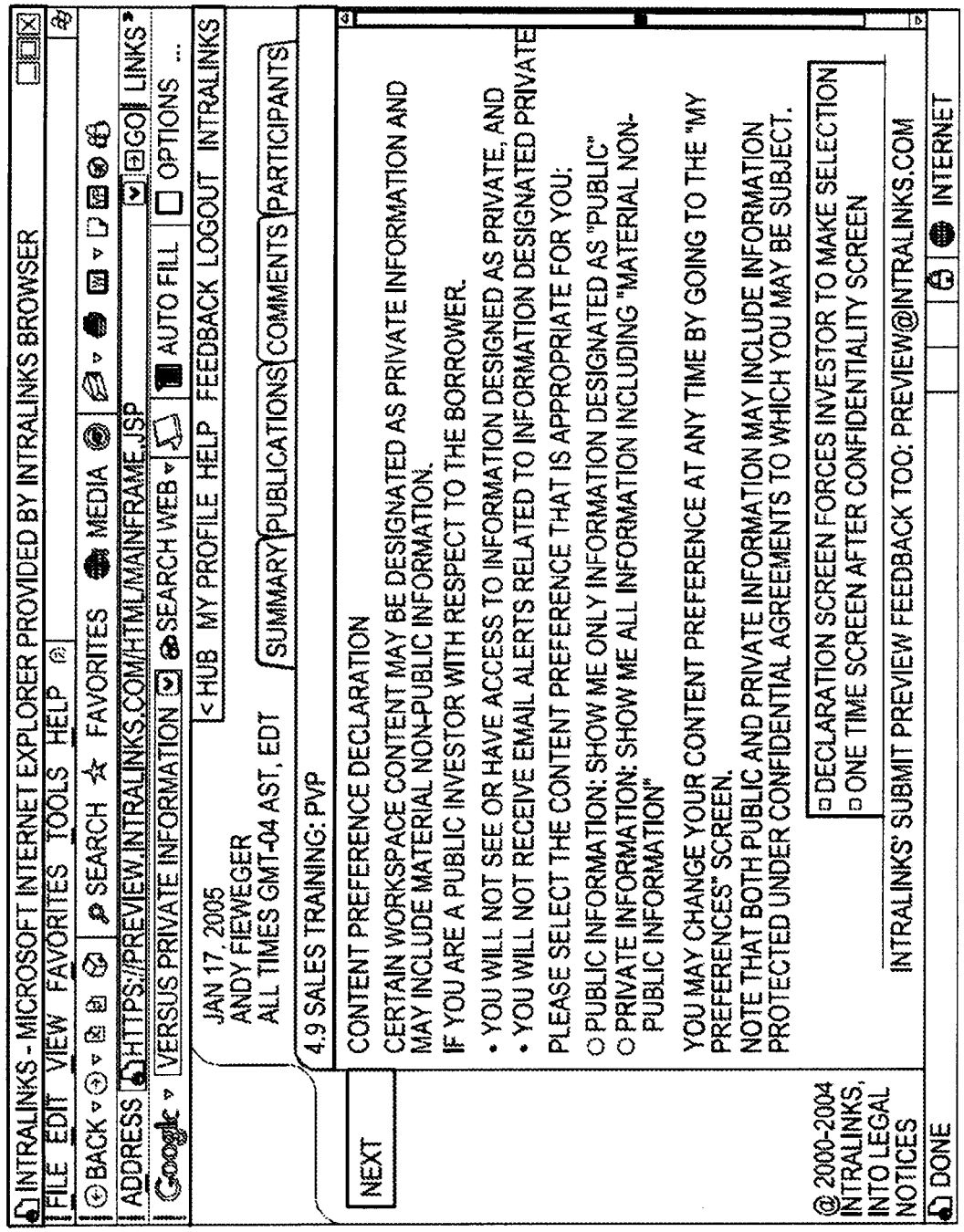
FIG. 1B shows a web browser screenshot of self-declaring a permission attribute according to an embodiment of the present invention.

Referring now to FIG. 1B, it is seen that the user who may try to access the uploaded information (in this example an investor) self-declares his or her own permission attribute (having a value of either pubic or private in this example). As seen in this FIG, in this example the investor may be forced to make a selection before proceeding. In one specific example (which example is intended to be illustrative and not restrictive), the self-declaration can be made when the user enters any part of the system for accessing content relating to a subject company X and the self-declared permission attribute may remain associated with the user during this and any subsequent sessions within this portion of the system (or until such time as the user's access rights to such portion are terminated). In another specific example (which example is intended to be illustrative and not restrictive), the user could self-declare the permission attribute the first time he or she enters a portion of the system containing specific content (e.g., related to company X) and have the same self-declared permission attribute control access to content in other and additional portions of the system containing different content (e.g., related to company Y).

Figure 1C:
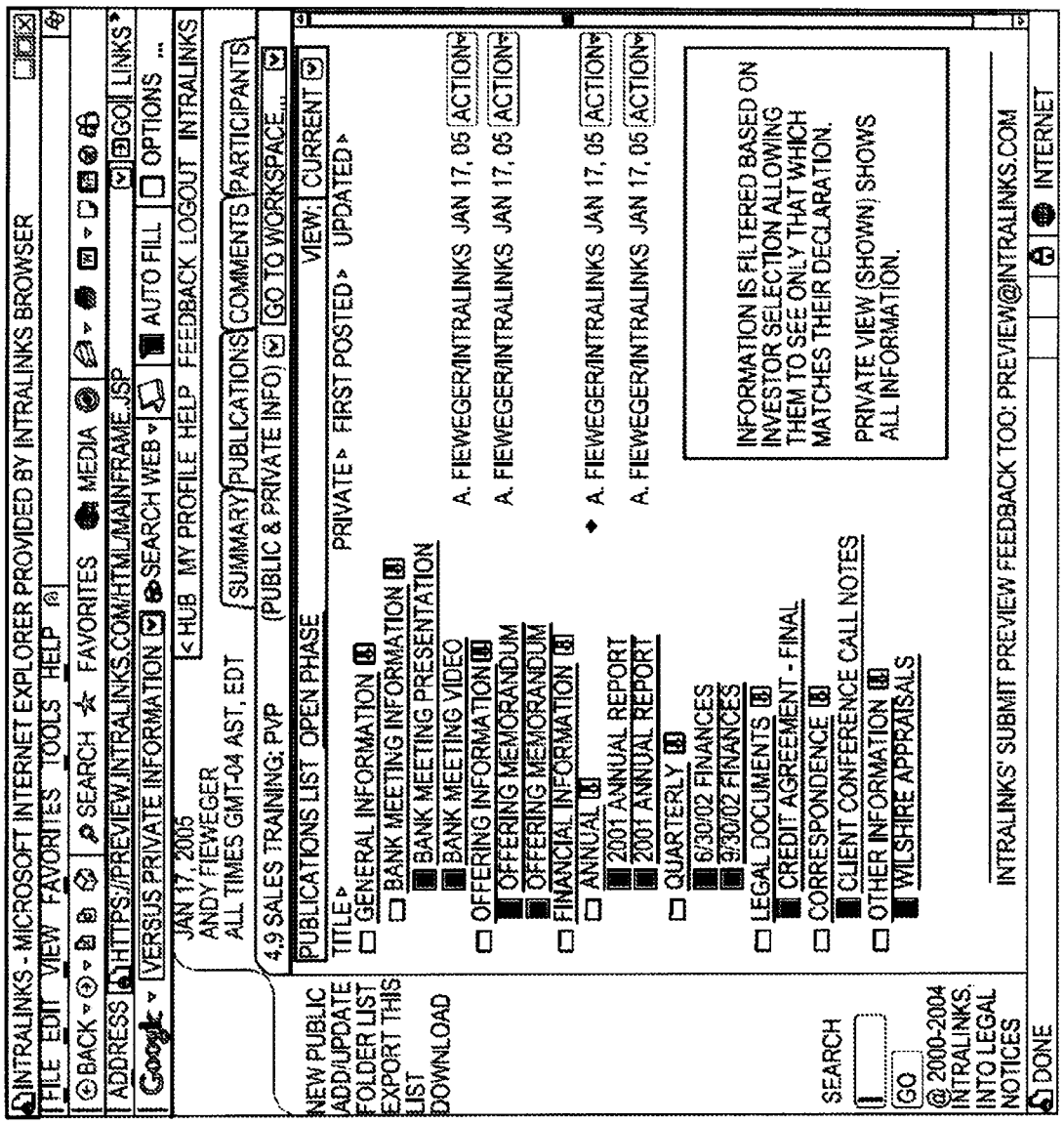
FIG. 1C shows a web browser screenshot of hyperlinks to certain information according to an embodiment of the present invention.
Figure 1D:
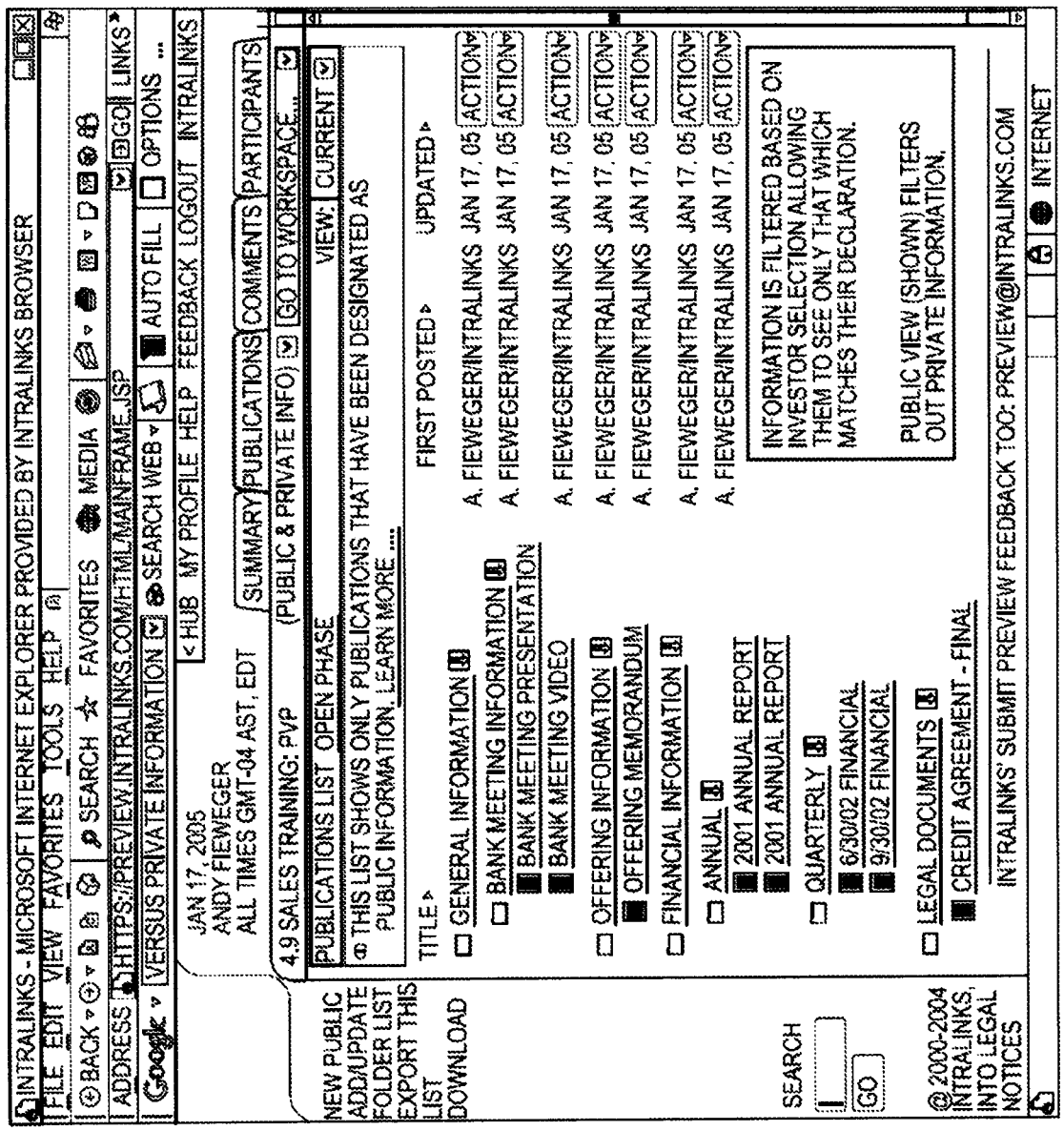
FIG. 1D shows a web browser screenshot of hyperlinks to certain information according to an embodiment of the present invention.

Further, as seen in FIGS. 1C and 1D, information in the system may be filtered (that is, access controlled) based upon the self-declared permission attribute values of each user. That is, FIG. 1C shows a listing (e.g., in the form of hyperlinks) of information accessible by users who have self-declared the "Private" permission attribute value (this information may comprise information which had been categorized as "Private" as well as information which had been categorized as "Public"). Similarly, FIG. 1D shows a listing (e.g., in the form of hyperlinks) of information accessible by users who have self-declared the "Public" permission attribute value (this information may comprise information which had been categorized as "Public" (e.g., information which may be viewed by anybody generally having access to the system or a portion thereof) and may exclude information which had been categorized as "Private").

Figure 1E:
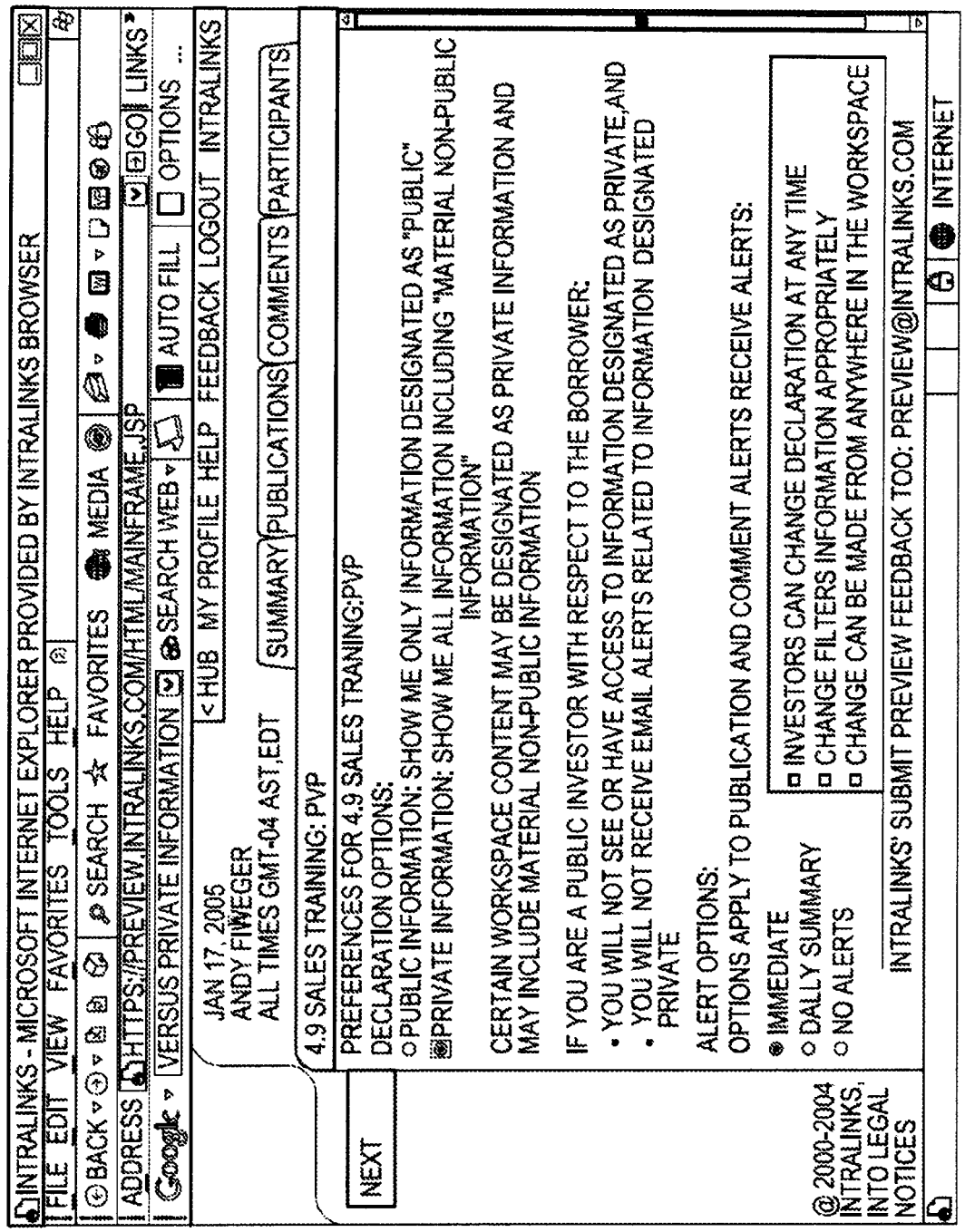
FIG. 1E shows a web browser screenshot related to changing a self-declared permission attribute according to an embodiment of the present invention.
Figure 1F:
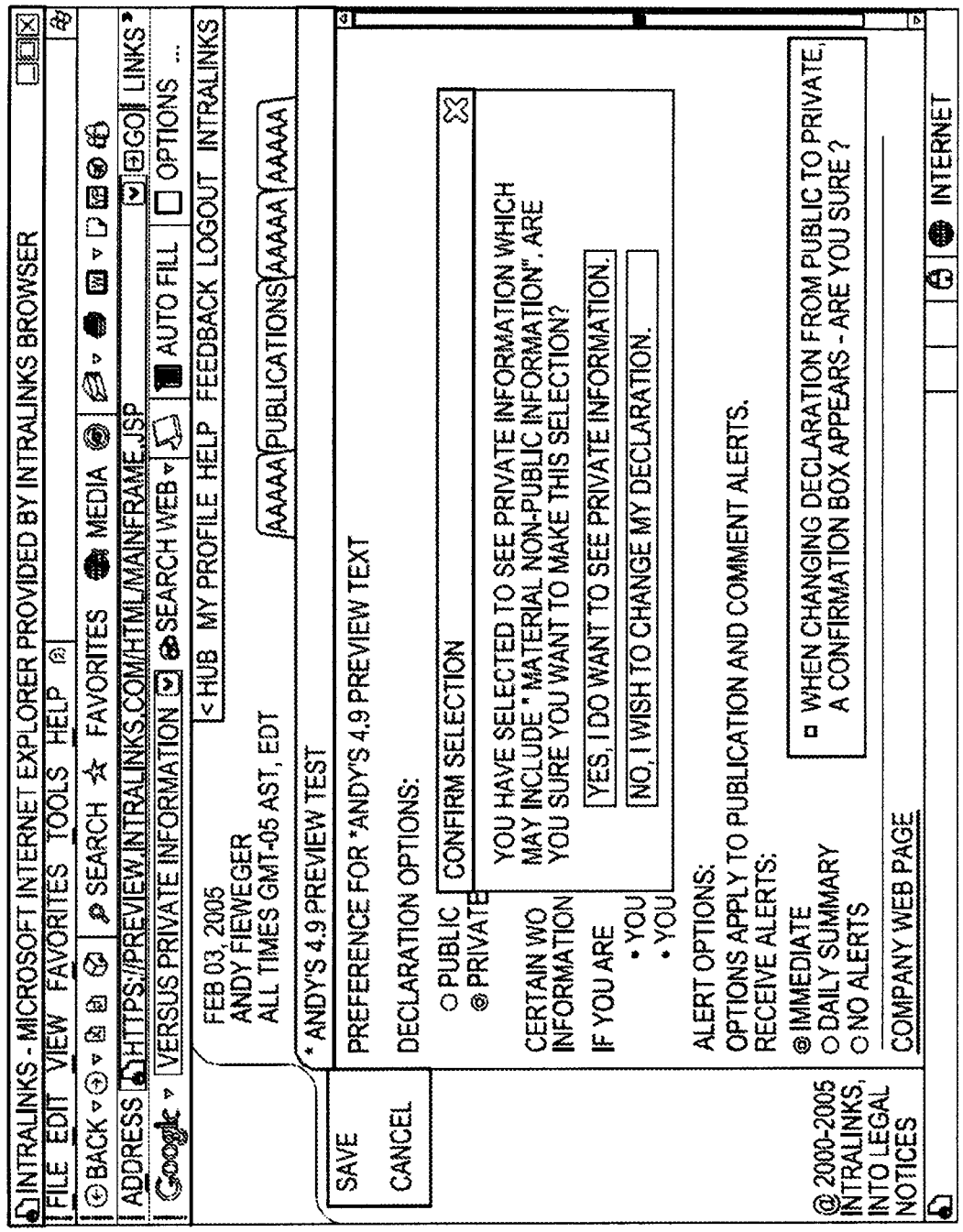
FIG. 1F shows a web browser screenshot related to changing a self-declared permission attribute according to an embodiment of the present invention.

Of course, users may be given the opportunity to change the self-declared permission attributes. That is, the initially self-declared permission attribute(s) could applied to all visits to the system or portions thereof until the user explicitly changes the user's attribute(s) within the user profile section of the enterprise information system or elsewhere (e.g., through a user interface). In this regard, FIG. 1E shows a web browser screenshot related to such changing of a self-declared permission attribute value and FIG. 1F shows a web browser screenshot related to confirmation of the change.

Figure 2:
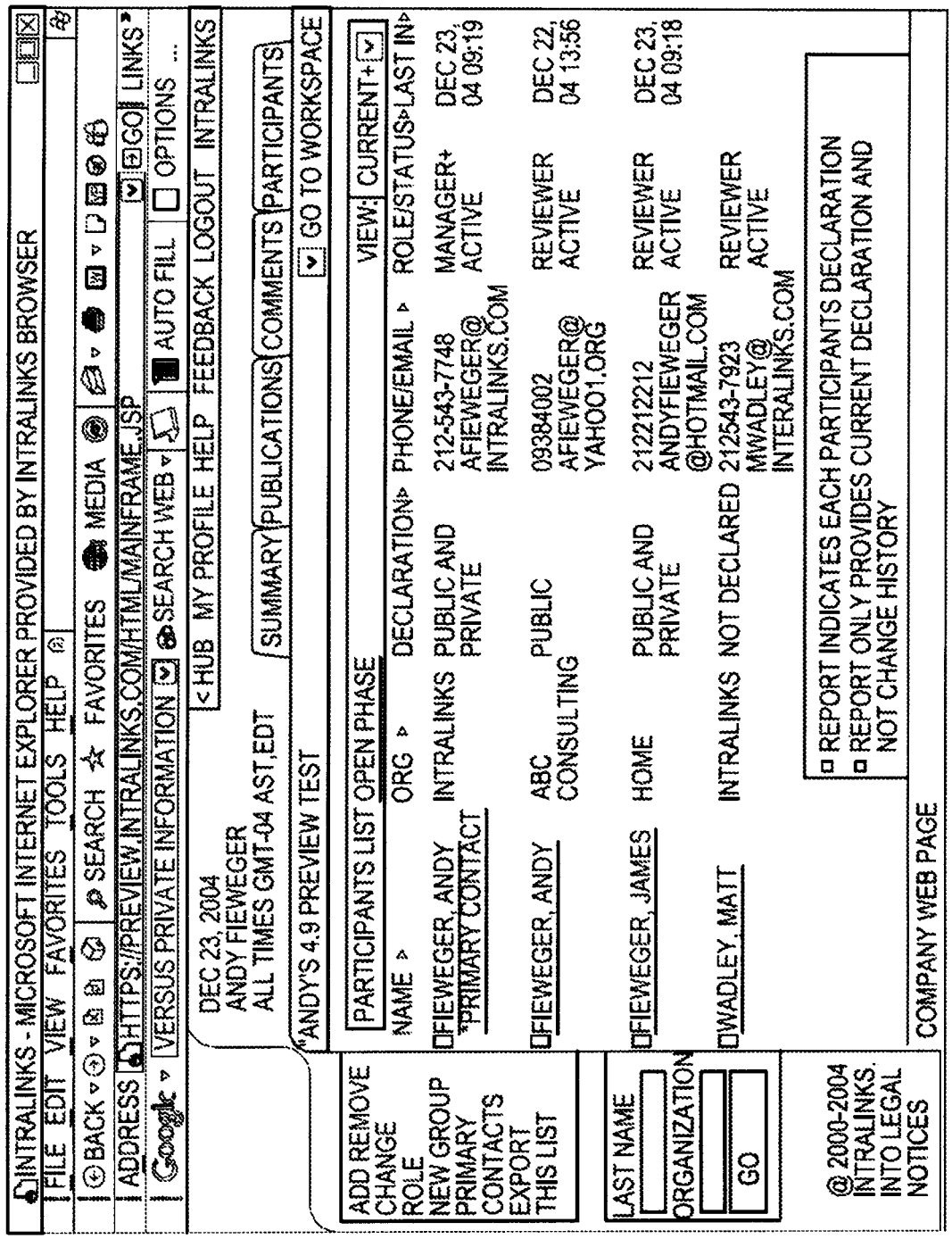
FIG. 2 shows a web browser screenshot of a report related to various self-declared permission attributes according to an embodiment of the present invention.

Referring now to FIG. 2, this Fig. shows a web browser screenshot of a report related to various self-declared permission attributes according to an embodiment of the present invention. In this regard, the present invention may track access to content with associated classifications and store the access details in an audit record (a compete audit trail of what information was disclosed/accessed (e.g., relative to each given investor), when the information was disclosed/accessed and how the information was classified at the time of being disclosed/accessed may be provided).

More particularly, in one example (which example is intended to be illustrative and not restrictive), an audit entry may comprise the user's name and ID, date and time of the access, information related to the content and other data. An additional audit entry may made each and every time a user accesses any content in the system (anywhere in the system or in one or more specific portions of the system). Also recorded may be any changes to a user's self-declared permission attributes(s).

All audit records related to the content access, the content classification and/or the user's self-declared permission attribute(s) may be made available to authorized users and administrators through reports. The audit record may be used to provide a compliance officer of a company or regulatory entities with the ability to track compliance and detect violations of the regulations or company policies and take corrective action.

In another example (which example is intended to be illustrative and not restrictive), auditing policies can be embodied as follows: 1) in a definition in a user interface and stored in database tables and interpreted (or compiled) during runtime; 2) in a definition in configuration fields that are interpreted by business logic; and/or 3) in business logic that is incorporated into an existing system.

Referring now to FIG. 3, this Fig. shows a screenshot of an alert relating to certain stored information according to an embodiment of the present invention. More particularly, as seen in this Fig. a communication (e.g., via email or another mechanism) may be sent to one or more users indicating a change in content (e.g., the uploading of a new document to the system, the editing of an existing document, etc.).

In one example (which example is intended to be illustrative and not restrictive), an alert related to content classified as "public" will go to appropriate users who have self-declared permission attributes of "public" or "private".

In another example (which example is intended to be illustrative and not restrictive), an alert related to content classified as "private" will go to appropriate users who have self-declared permission attributes of "public" or "private" (wherein "public" users are responsible for actually accessing the content or not).

In another example (which example is intended to be illustrative and not restrictive), an alert related to content classified as "private" will go to appropriate users who have self-declared a permission attribute of only "private" (wherein self-declared "public" users are not notified by the alert).

As described above, one embodiment of the present invention enables administrators and content managers to associate classifications and allowable classification values with the content of an enterprise information system. These classifications may already be included in the enterprise information system or may be specifically designed by its system administrator to represent classifications of the content. The classifications are typically not part of the content but may describe and represent the user characteristics, security clearance levels and/or metadata associated with access to the content.

In one example (which example is intended to be illustrative and not restrictive), the present invention may provide a user of an enterprise information system with the ability to dynamically select an existing or create a new information filter for current and/or future content managed by the enterprise information system.

In another example (which example is intended to be illustrative and not restrictive), a user may be required to select an existing or create a new permission attribute when he or she accesses the system the first time or after new classifications/permission attributes have been added. This may be done as soon as the user passes appropriate user credentials to the enterprise information system but before the user gains access to the functions of the enterprise information system (see, e.g., FIG. 1B). After the user creates or selects one or more permission attributes (that is, having desired values associated therewith), the system starts to release and suppress content accordingly. Of course, the fact that the user self-declares his or her permission attributes may comprise a differentiation from security systems in which an administrator selects a security level by user or by group and does not allow a user or member of such group to declare the presence of attributes associated with different security levels.

In another example (which example is intended to be illustrative and not restrictive), permission attribute(s) may be selected that are known to the user, notwithstanding that the user may not know or anticipate the nature, purpose or substance of the content on which such permission attributes(s) will act as a filter.

In another example (which example is intended to be illustrative and not restrictive), filtering may act on any single attribute or combination of multiple attributes, such that a plurality of users with the same permission attribute(s) may not have access to the same content, to the extent access is filtered by other attribute(s) or combinations of attribute(s).

In another example (which example is intended to be illustrative and not restrictive), the present invention may classify information not only based upon content but upon a location of a document within the system, a publication source, a comment, a reply, and/or association with other users (among other possibilities).

In another example (which example is intended to be illustrative and not restrictive), the visibility of certain information (e.g., represented by hyperlinks to stored information) may be implemented through various columns in database tables.

In another example (which example is intended to be illustrative and not restrictive), two (or more) aliases or user names per user could be defined. One alias could apply automatically one or more attributes for purposes of filtering access to content; the other aliases could apply to other attribute(s) for filtering access to content.

In another example (which example is intended to be illustrative and not restrictive), the system or system administrator can turn on or off each user's ability to self-declare permission attribute(s).

In another example (which example is intended to be illustrative and not restrictive), a limited or essentially unlimited number of classifications/classification values may be defined and linked to content, independent of modifications to the core system for storing and/or distributing content. Depending on the implementation strategy, the extensions can be made while the system is operating or before the system is restarted (of course, any desired number of self-declared permission attributes/permission attribute values may also be utilized).

For a limited number of classifications (e.g. 1 to 10), the system may add additional columns to the content tables in the database to be used only when an additional classification information is added. The business logic could manage the classifications and could expand the queries as new classifications are added. Under this approach the query overhead may be minimized and the overall system performance may not be significantly impacted.

For an essentially unlimited number of classifications to be supported, the classifications could be placed in separate database tables and linked with a 1-n relationship to the content tables. Filtering could be accomplished using either an additional query per access to content or a table joined between the table that contains the content and the table that contains the classifications and their allowable values.

The allowable values per classification may be defined in multiple ways including, but not limited to, the following approaches:

1. A user interface that allows a user to define the allowable values per classification and stores them as metadata in an allowable value table.
2. A configuration file that is loaded at system start or when a change is registered by the server.
3. Business logic that can be plugged into the existing system after the release date.

The business logic and user interface may be constructed so that the classifications are considered when content is retrieved and/or updated.

The system programmer, system administrator, and/or user could create filters depending on the required flexibility in multiple ways including, but not limited to, the following approaches:

1. A user interface allows system administrators and/or users to define filters based on the logical combination of classifications and allowable values. The expressions may be stored in database tables. The data may be interpreted (or compiled and executed) during runtime.
   a. In one example (which example is intended to be illustrative and not restrictive), expressions such as "attribute_1 IN {val1, val2} AND NOT attribute_2 IN {val3}" could be defined by the user and/or system administrator to define a filter that filters out all content that has the values "val1" and "val2" in its classification "attribute_1" and does not have the value "val3" in the classification "attribute_2".
2. The filters could be defined by system programmers and/or system administrators in a configuration file and interpreted after the expression is loaded into the system. The expression can be the same or similar to the expression in the bullet (a) above.
3. The system programmer could develop filters as business logic that are incorporated into the existing system. The plug-in may be loaded when the system is registering the new plug-ins and makes the filters available to the user when the functionality is desired to be used.

Referring now to FIGS. 4-9 block diagrams related to databases and database structures according to various embodiments of the present invention are shown.

Figure 4:
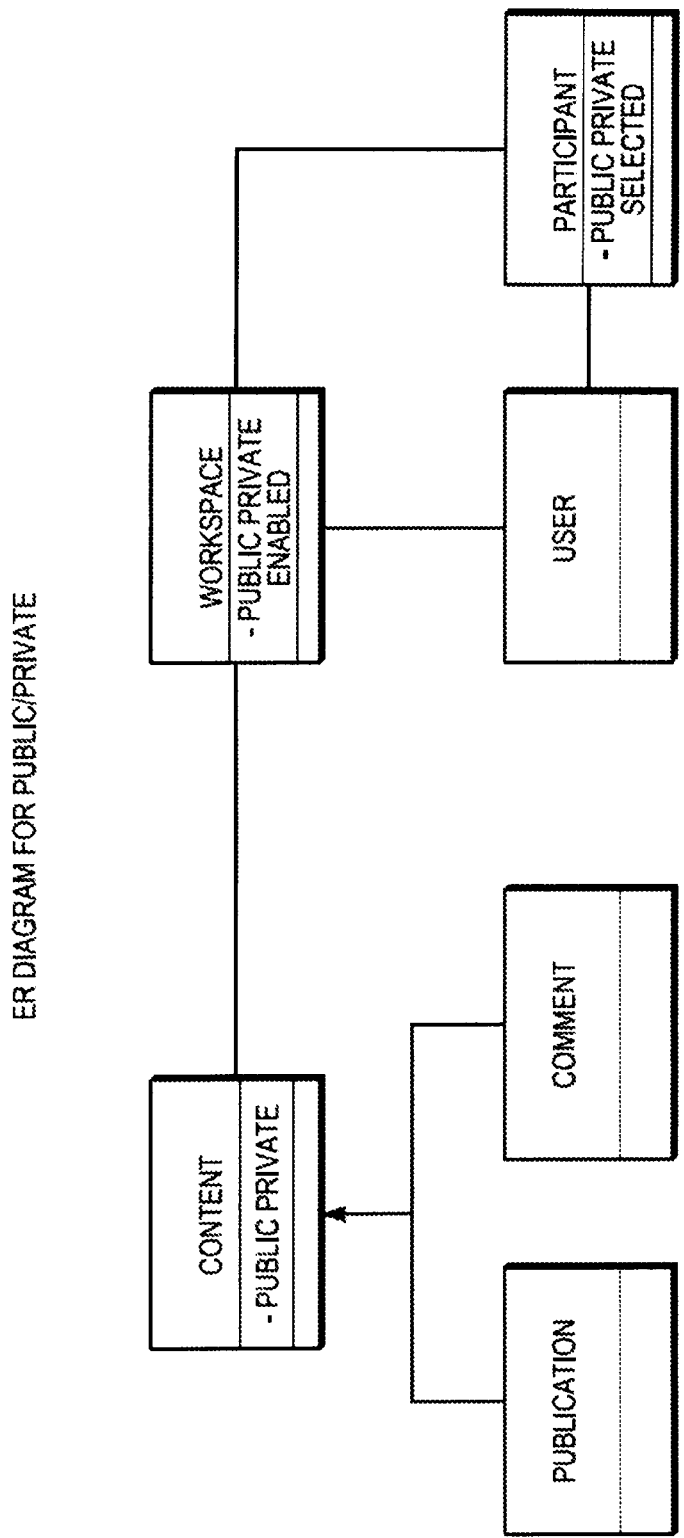
FIGS. 4-9 show block diagrams related to databases and database structures according to various embodiments of the present invention.

More particularly, as seen in the example of FIG. 4, all Content has associated therewith a flag that indicates if Content is public or private information. Publication and Comment are subtypes of Content and therefore inherit that flag. Further, a participant is realized in the database and in the Java implementation as a relationship between the workspace and the user tables (objects in java). Therefore, the participant references the user in a particular workspace. Moreover, the workspace contains an attribute "publicPrivateEnabled" that indicates if the public-private feature is enabled for the specific workspace. Further, the participant has an attribute called "publicPrivateSelected" that indicates if the particular user has self-declared the value "public" or "private" for the associated workspace.

Figure 5:
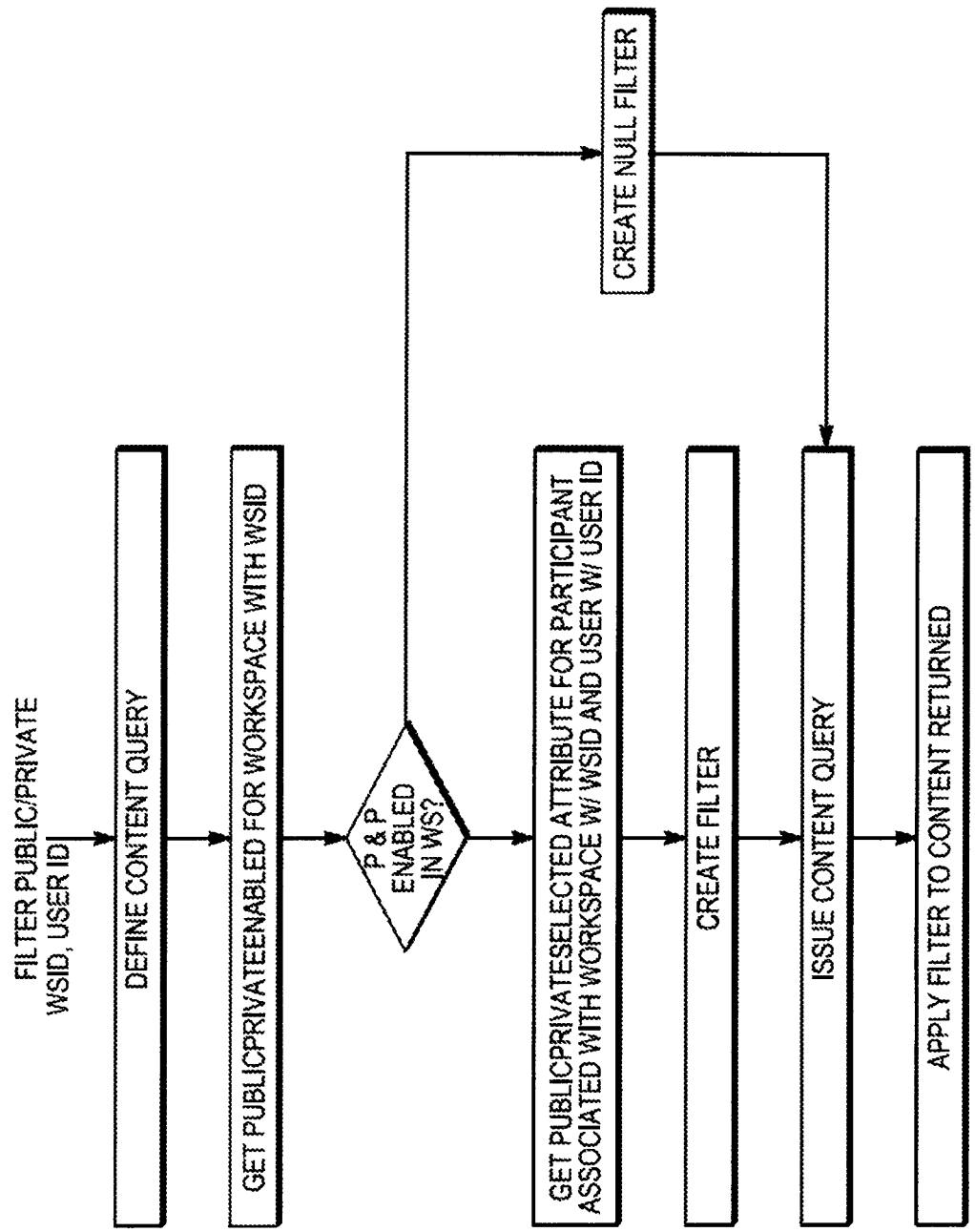

Referring now to FIG. 5, in this example the Null Filter does not perform any filtering. The idea here is the filter is created to filter all returned Content items based on the publicPrivate flag. So, if the user only wants to see public information, the filter will filter out each returned content item that has a private flag. If the user wants to view private and public information, the filter allows all content to pass (Null filter).

Figure 6:
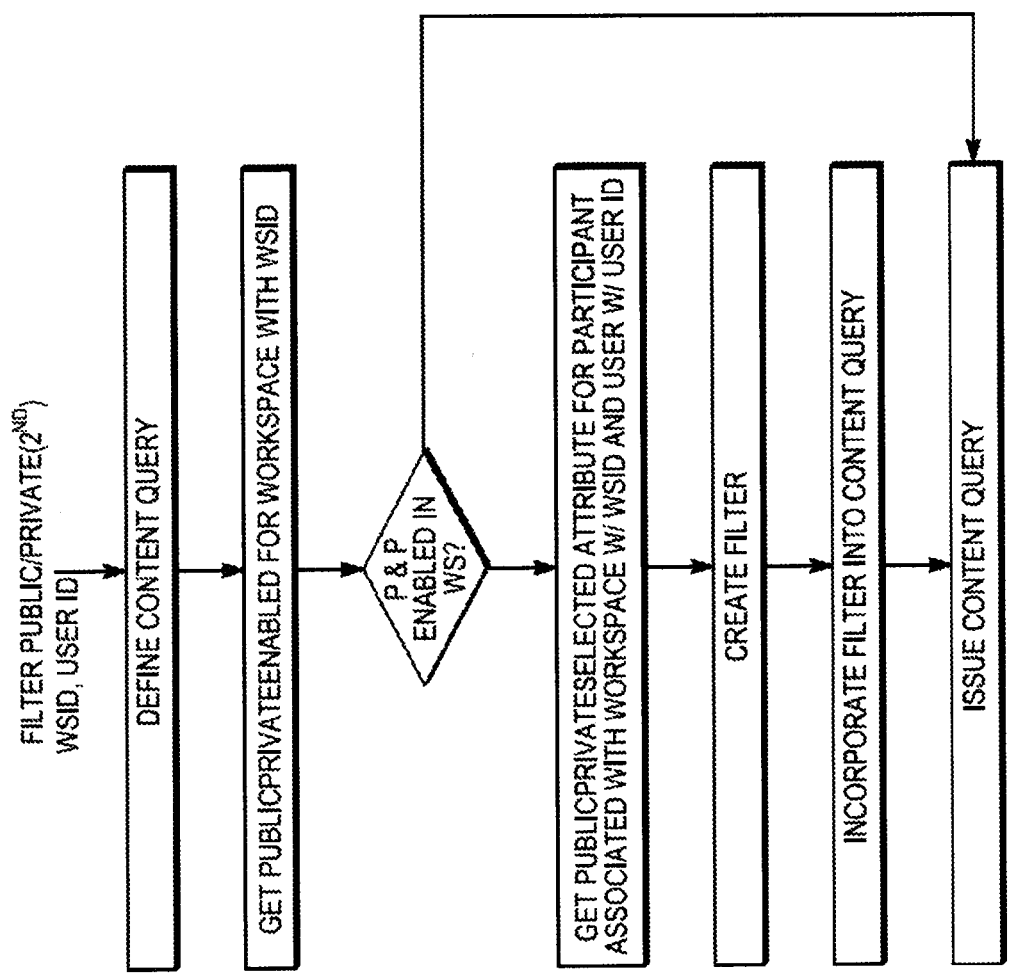

Referring now to the example of FIG. 6, essentially same mechanisms may exist here as before (e.g., FIG. 5). However, in this example the filter is created as a filter criteria for the query that is issued to the database or search engine. This implies that that the filter criteria is incorporated in the defined content query (e.g. in a simple SQL query the filter criteria would be included in the WHERE clause).

Figure 7:
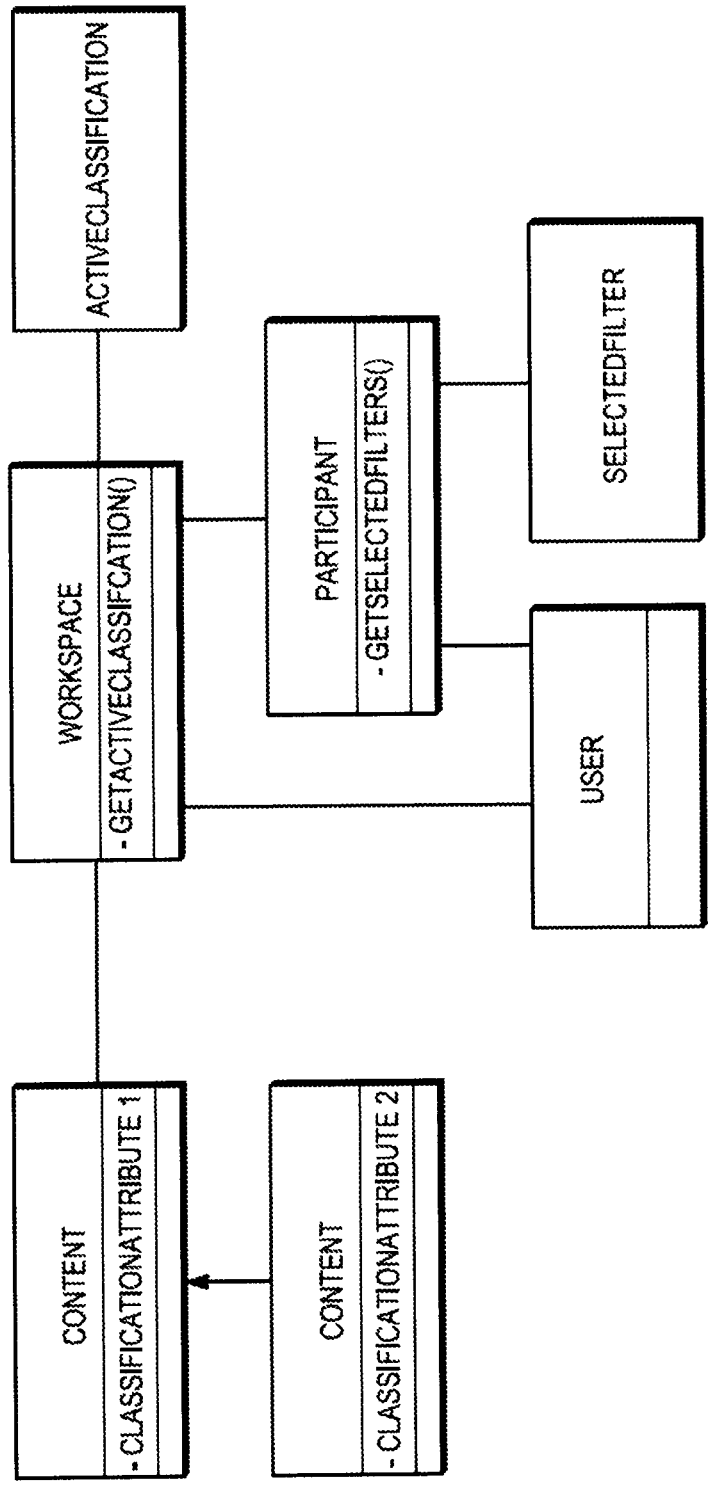

Referring now to FIG. 7, this example is a generalized version of the public/private feature. Content or subtypes of Content have specific classification attributes that can be used for filtering. The Workspace maintains in associated tables (ActiveClassification) the classifications that are enabled in a particular workspace. The active classifications can be retrieved calling the method getActiveClassificationQ. The participant refers to a list of selected Filters in the SelectedFilter table. The filters can be accessed through the method getSelectedFiltersO.

Figure 8:
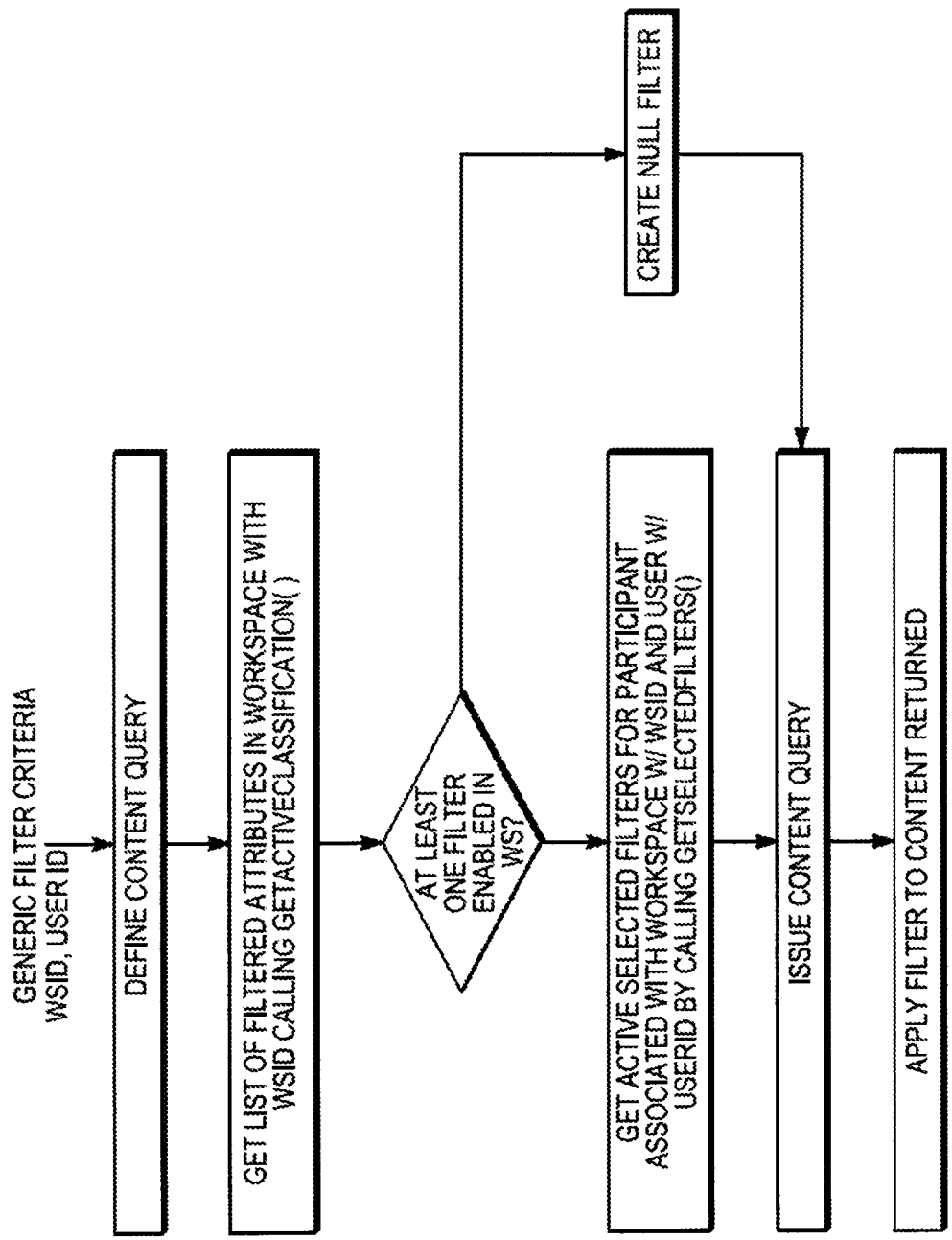

Referring now to FIG. 8, this example is similar to the private/public case. However, here the selected filters that are active in the workspace are selected by the participant in a given workspace. The assumption is that the filter is stored and retrieved by the system (this can be done by a multitude of approaches such as object serialization or Object-relationship mapping).

Figure 9:
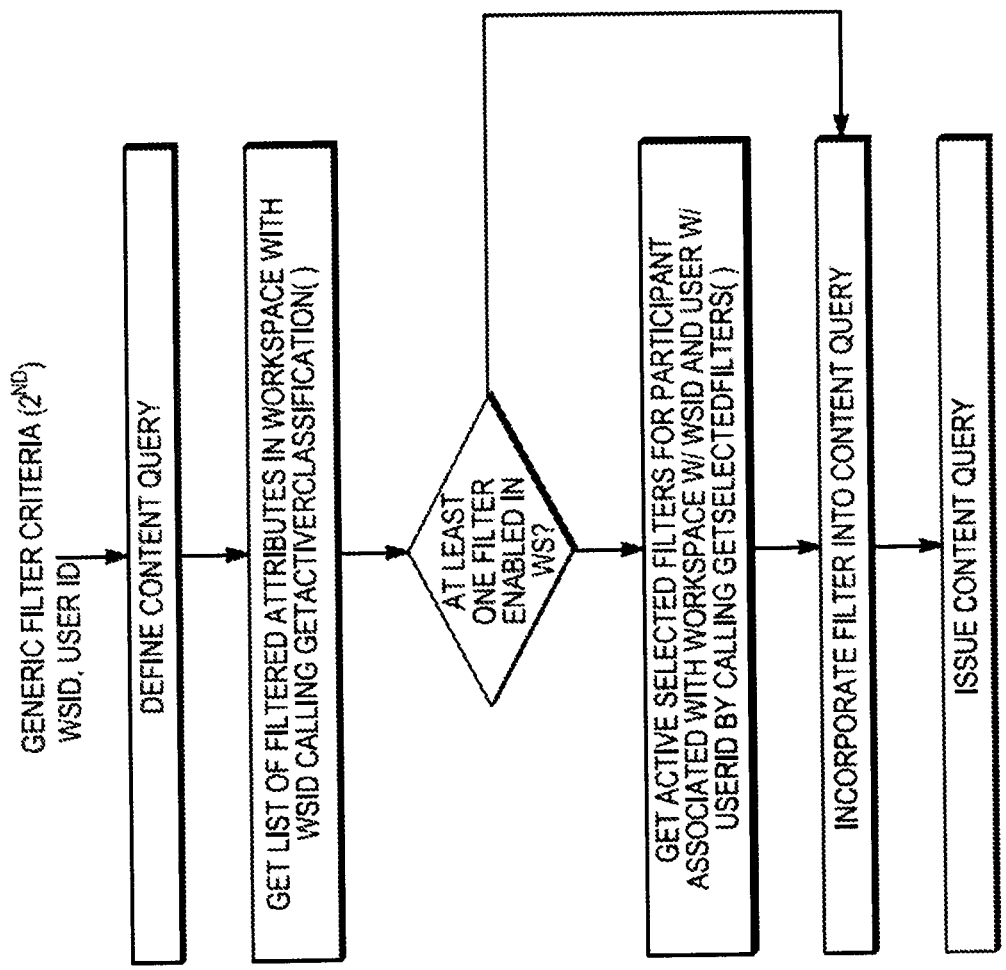

Referring now to FIG. 9, this example is essentially the same as before (e.g., FIG. 8) but in this scenario the search filters are embedded in the content query.

Figure 10:
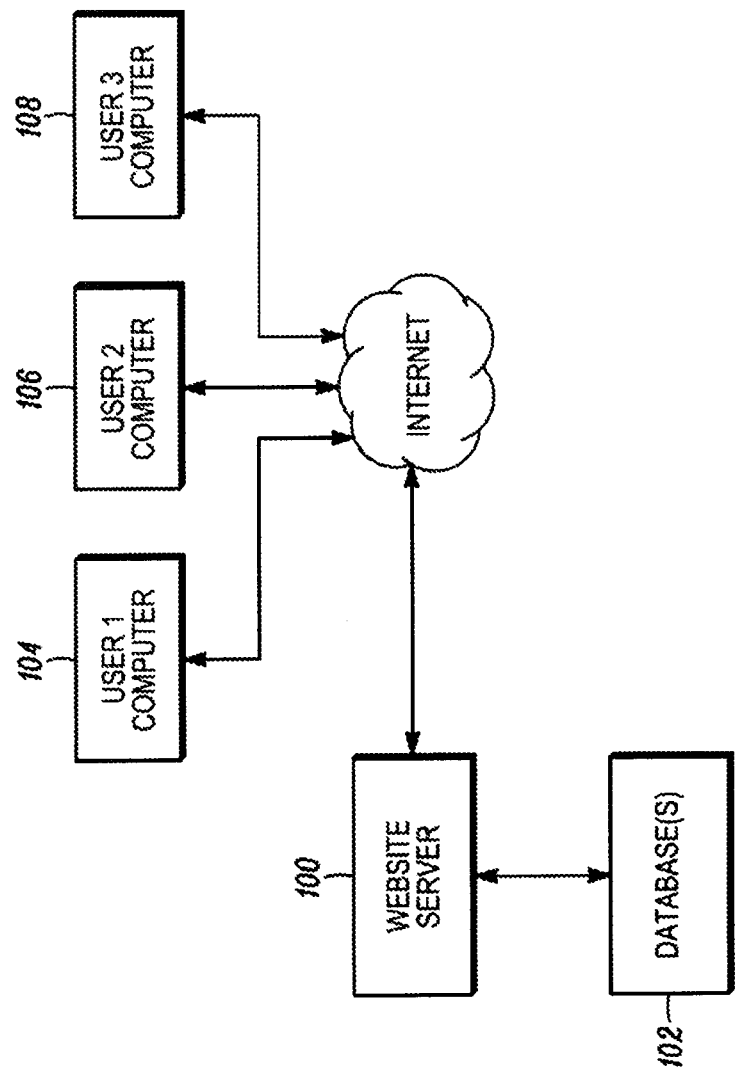
FIG. 10 shows a block diagram of a computer infrastructure according to an embodiment of the present invention.

Referring now to FIG. 10, a block diagram of a computer infrastructure according to an embodiment of the present invention is shown. More particularly, as seen in this FIG. 10, Website Server 100 (which may have associated therewith one or more Databases 102) operatively communicates (e.g., via the Internet) with User 1 Computer 104, User 2 Computer 106 and User 3 Computer 108. Of note, each of User 1 Computer 104, User 2 Computer 106 and User 3 Computer 108 may have associated therewith appropriate software (e.g., a web browser). Of further note, each of User 1, User 2 and User 3 may be any entity described herein (e.g., a person uploading a document, a person viewing a document, a person editing a document, a person downloading a document).

Finally, reference will now be made to a number of examples directed to permission attributes and permission attribute values (of course, these examples are intended to be illustrative, and not restrictive).

More particularly, in one example (as discussed above) a permission attribute may refer to a user's public/private status relative to certain information. Associated permission attribute values may be, for example, "private" and "public". In another example, associated permission attribute values may be "yes" and "no" (indicating a private status or a public status). In another example, associated permission attribute values may be "1" and "0" (indicating a private status or a public status).

In another example, a permission attribute may refer to a user's country of residence. Associated permission attribute values may be, for example, "USA" and "Other". In another example, associated permission attribute values may be "yes" and "no" (indicating a USA residence status or another residence status). In another example, associated permission attribute values may be "1" and "0" (indicating a USA residence status or another residence status).

In another example, a permission attribute may refer to a user's security level. Associated permission attribute values may be, for example, "High" and "Low". In another example, associated permission attribute values may be "yes" and "no" (indicating a high security level or a low security level). In another example, associated permission attribute values may be "1" and "0" (indicating a high security level or a low security level). In another example, associated permission attribute values may be in a numeric range (indicating a security level within a range).

In another example, a permission attribute may refer to a user's age. Associated permission attribute values may be, for example, "at least 18 years old" and "below 18 years old". In another example, associated permission attribute values may be "yes" and "no" (indicating at least 18 years old or below 18 years old). In another example, associated permission attribute values may be "1" and "0 (indicating at least 18 years old or below 18 years old). In another example, associated permission attribute values may be a user's age.

Of course, any number of permission attributes may be combined in controlling access to information. For example (which example is intended to be illustrative, and not restrictive), a first user who is a "private" user and is a "USA resident" may be granted access to a first set of information; a second user who is a "public" user and is a "USA resident" may be granted access to a second set of information; a third user who is a "private" user and is "not a USA resident" may be granted access to a third set of information; and a fourth user who is a "public" user and is "not a USA resident" may be granted access to a fourth set of information (in this example, the first through fourth sets of information may be distinct from one another or there may be overlap (partial or total) between information in one or more of the sets of information).

In another example, the steps are carried out in the order recited. In another example, the first permission attribute value and the third permission attribute value are the same and the second permission attribute value and the fourth permission attribute value are the same.

While a number of embodiments of the present invention have been described, it is understood that these embodiments are illustrative only, and not restrictive, and that many modifications may become apparent to those of ordinary skill in the art. For example, an implementation of the present invention may separate the filter logic from the logic related to the security system (of course, the security system may be extended to enforce also the filter criteria). Further, the content filter may be designed and implemented to facilitate compliance with federal and/or state regulations and/or with corporate policies regarding access to information (e.g., access to "private" information). Further still, under various embodiments of the present invention certain users (e.g., syndicating agent, administrative agent, sales desk) do not need to be responsible for knowing and identifying what information is private. Rather, an issuer may be responsible for this (e.g., by classifying uploaded documents appropriately). Likewise, under various embodiments of the present invention certain users (e.g., syndicating agent, administrative agent, sales desk) do not need to be responsible for knowing and identifying a given investor's "status" (e.g., private or public) relative to a given issuer. Rather, each investor may be responsible for this (e.g., by self-declaring one or more permission attributes). Moreover, under various embodiments of the present invention certain users (e.g., loan investors) may be provided a mechanism for identifying "private" information in order to minimize the potential for unintentional/inappropriate exposure (the present invention may provide for this to be handled in the market by a consistent industry approach). Further still, the present invention may be used to apply other classifications and filters that are built in essentially the same way as the "visibility" classification, e.g., by adding additional columns to content tables and extending business logic and database queries to reflect their meaning to the business process (under this implementation strategy the system performance may be optimized since the system can perform very efficient filtering at the database layer). Further still, the self-declared permission attributes of the present invention may be applied to all content managed by an enterprise information system or to a subset of the content managed by an enterprise information system. (e.g., on a client by client basis or on a deal by deal basis). Further still, access to specific content may be filtered by hiding certain content (e.g., providing a given user a list of hyperlinks to content which may be accessed by that user, based upon the content classification and the user's self-declared permission attribute(s), and not including in the list of hyperlinks any excluded content) or by prohibiting access to certain content (e.g., providing a given user a list of hyperlinks to content which may or may not be accessed by that user, based upon the content classification and the user's self-declared permission attribute(s), and prohibiting assess to excluded content if the user clicks an excluded hyperlink). Further still, the various steps may be performed in any desired order, one or more steps may be deleted and/or one or more steps may be added.

What is claimed is:

1. A method for computer data content access, comprising:
providing a computer database in association with a computer server for storing a plurality of computer data content items, wherein each of the plurality of computer data content items is assigned a classification attribute that indicates a target audience by a first user through a first user computer in communication with the computer server via a network, and wherein at least one classification attribute categorizes at least one of the plurality of computer data content items as belonging to a category that another user is conflicted from viewing according to a policy associated with the other user;
providing, by the first user of the first user computer, permission for a second user through a second user computer to request access to the plurality of computer data content items;
receiving, at the computer server, a request for access to the at least one of the plurality of computer data content items from the second user through the second user computer via the network, wherein the request for access comprises a permission attribute that identifies at least one category of data content items that a second user is not conflicted from viewing, wherein the permission attribute is self-declared by the second user and restricts the second user's access to the at least one of the plurality of computer data content items if the permission attribute self-declared by the second user does not match the classification attribute assigned by the first user; and wherein the permission attribute reflects a policy associated with the second user, policy violations comprise violations of an insider trading policy, a privilege policy, an antitrust policy, and a conflict of interest policy, and wherein the reflected policy of the self-declared permission attribute relates to at least one of an insider trading policy, a privilege policy, an antitrust policy, and a conflict of interest policy applicable to the second user's access to the content; and
granting access, by the computer server, to the second user to the at least one of the plurality of computer data content items if the classification attribute assigned by the first user matches the permission attribute self-declared by the second user.

2. The method of claim 1, wherein at least one of the classification attribute and the permission attribute is associated with a company name related to the content of the at least one of the plurality of computer data content items.

3. The method of claim 1, wherein at least one of the classification attribute and the permission attribute is associated with a named individual related to the content of the at least one of the plurality of computer data content items.

4. The method of claim 1, wherein at least one of the classification attribute and the permission attribute is at least one of public and private.

5. The method of claim 1, wherein the permission attribute is used in the filtering of the at least one computer data content items within the computer database in determination of the computer data content items to which the second user is granted access.

6. The method of claim 1, wherein the second user's selection of the permission attribute is declared at the time of the requested access.

7. The method of claim 1, wherein the second user's selection of the permission attribute has been previously declared and stored in association with the computer database.

8. The method of claim 1, wherein the computer database is a secure computer data storage facility.

9. The method of claim 1, wherein the at least one of the plurality of computer data content items is a computer-based document.

10. The method of claim 1, wherein the classification attribute is stored in the computer database.

11. The method of claim 1, wherein the assignment of the classification attribute is made in metadata associated with the at least one of a plurality of computer data content items.

12. A method for computer data content access, comprising:
providing a computer database in association with a computer server for storing a plurality of computer data content items, wherein each of the plurality of computer data content items is assigned a classification attribute that indicates a target audience by a first user through a first user computer in communication with the computer server via a network, and wherein at least one classification attribute categorizes at least one of the plurality of computer data content items as belonging to a category that another user is conflicted from viewing according to a policy associated with the other user;
providing, by the first user of the first user computer, permission for a second user through a second user computer to request access to the plurality of computer data content items;
receiving, at the computer server, a request for access to the at least one of the plurality of computer data content items from the second user through the second user computer via the network, wherein the request for access comprises a permission attribute that identifies at least one category of data content items that a second user is conflicted from viewing, wherein the permission attribute is self-declared by the second user and restricts the second user's access to the at least one of the plurality of computer data content items if the permission attribute self-declared by the second user matches the classification attribute assigned by the first user; wherein the permission attribute reflects a policy associated with the second user, policy violations comprise violations of an insider trading policy, a privilege policy, an antitrust policy, and a conflict of interest policy, and wherein the reflected policy of the self-declared permission attribute relates to at least one of an insider trading policy, a privilege policy, an antitrust policy, and a conflict of interest policy applicable to the second user's access to the content; and
granting access, by the computer server, to the second user to the at least one of the plurality of computer data content items if the classification attribute assigned by the first user does not match the permission attribute self-declared by the second user.

13. A method for computer data content access, comprising:
providing a computer database in association with a computer server for storing a plurality of computer data content items, wherein each of the plurality of computer data content items is assigned a classification attribute that indicates a target audience by a first user through a first user computer in communication with the computer server via a network, and wherein at least one classification attribute categorizes at least one of the plurality of computer data content items as belonging to a category that another user is conflicted from viewing according to a policy associated with the other user;
providing, by the first user of the first user computer, permission for a second user through a second user computer to request access to the plurality of computer data content items;
receiving, at the computer server, a request for access to the at least one of the plurality of computer data content items from the second user through the second user computer via the network, wherein the request for access comprises a permission attribute that identifies at least one category of data content items that a second user is not conflicted from viewing, wherein the permission attribute is self-declared by the second user and restricts the second user's access to the at least one of the plurality of computer data content items if the permission attribute self-declared by the second user does not match the classification attribute assigned by the first user; wherein the permission attribute reflects a policy associated with the second user, policy violations comprise violations of an insider trading policy, a privilege policy, an antitrust policy, and a conflict of interest policy, and wherein the reflected policy of the self-declared permission attribute relates to at least one of an insider trading policy, a privilege policy, an antitrust policy, and a conflict of interest policy applicable to the second user's access to the content;
providing a hyperlink to the at least one of the plurality of computer data content items by the server-based content access management facility if the classification attribute assigned by the first user matches the permission attribute self-declared by the second user; and
granting access, by the computer server, to the second user to the at least one of the plurality of computer data content items if the classification attribute assigned by the first user matches the permission attribute self-declared by the second user.

* * * * *